US012650863B2

(12) United States Patent
Camiel

(10) Patent No.: US 12,650,863 B2
(45) Date of Patent: Jun. 9, 2026

(54) SYSTEM AND METHOD FOR THE USE OF REMOTE APPS WITH A USER DEVICE

(71) Applicant: Noam Camiel, Amstelveen (NL)

(72) Inventor: Noam Camiel, Amstelveen (NL)

( * ) Notice: Subject to any disclaimer, the term of this patent is extended or adjusted under 35 U.S.C. 154(b) by 175 days.

(21) Appl. No.: 18/385,910

(22) Filed: Nov. 1, 2023

(65) Prior Publication Data

US 2024/0152367 A1    May 9, 2024

Related U.S. Application Data

(60) Provisional application No. 63/422,991, filed on Nov. 6, 2022.

(51) Int. Cl.
| | |
|---|---|
| *G06F 9/451* | (2018.01) |
| *G06F 21/53* | (2013.01) |
| *H04L 9/40* | (2022.01) |
| *H04L 67/10* | (2022.01) |

(52) U.S. Cl.
CPC .............. *G06F 9/452* (2018.02); *G06F 21/53* (2013.01); *H04L 63/0435* (2013.01); *H04L 67/10* (2013.01)

(58) Field of Classification Search
CPC ..... G06F 9/452; G06F 21/53; H04L 63/0435; H04L 67/10
See application file for complete search history.

(56) References Cited

U.S. PATENT DOCUMENTS

2014/0122566 A1*    5/2014    Spracklen ............ H04N 19/895
                                                                709/203
2017/0353748 A1*    12/2017    Van Dusen ...... H04N 21/44209
2023/0107260 A1*    4/2023    Otsuka ................. H04N 19/166
                                                                375/240.27

OTHER PUBLICATIONS

Tomoharu Imai et al., An Adaptive Desktop Transfer Protocol for Mobile Thin Client, Dec. 1, 2010, IEEE Globecom 2010 Workshop on Mobile Computing and Emerging Communication Networks, pp. 1-5 (Year: 2010).*

S. Y. Gukov et al., Analysis of Approaches to Remote User Interface Transfer, Jun. 1, 2010, Wave Electronics and its Application in Information and Telecommunication Systems, pp. 1-8 (Year: 2020).*

* cited by examiner

*Primary Examiner* — Tam T Tran

(57) ABSTRACT

A system and method are introduced for a virtual application infrastructure (VAI) that executes apps remotely for users to interact with, preferably within a cloud-based container, while focusing on the user interactivity with these remote apps. A core innovation of the VAI lies in a novel method called 'raining,' designed to enable real-time interaction with remote applications, with a name that differentiates it from streaming. Unlike traditional streaming media, 'raining' an app requires only the discrete data of the current image of the app displayed in the cloud, eliminating the need for a history of previous data, such as required for audio and video. This innovative approach enables users to interact with remote apps efficiently, even when network bandwidth fluctuates. Additionally, the VAI may be offered as a service (VAI SaaS), which extends the advantages of traditional cloud deployments. It integrates both the cloud infrastructure and endpoints in the cloud, simplifying deployments, enhancing redundancy, reducing costs, and allowing service providers to focus on delivering services while mitigating security, regulation, and rollout risks.

21 Claims, 11 Drawing Sheets

| Display 402 | | | |
|---|---|---|---|
| Tile 1<br><br>404 | Tile 2<br><br>406 | | Tile n<br><br>408 |
| Tile n + 1 | Tile n + 2 | | Tile 2 * n |
| Tile 2n + 1 | Tile 2n+ 3 | | Tile 3 * n |
| | | | |
| | | | |
| | | | |
| | | | |
| Tile n(m-1) + 1 | Tile n(m-1) + 2 | | Tile n * m<br><br>410 |

Figure 4A

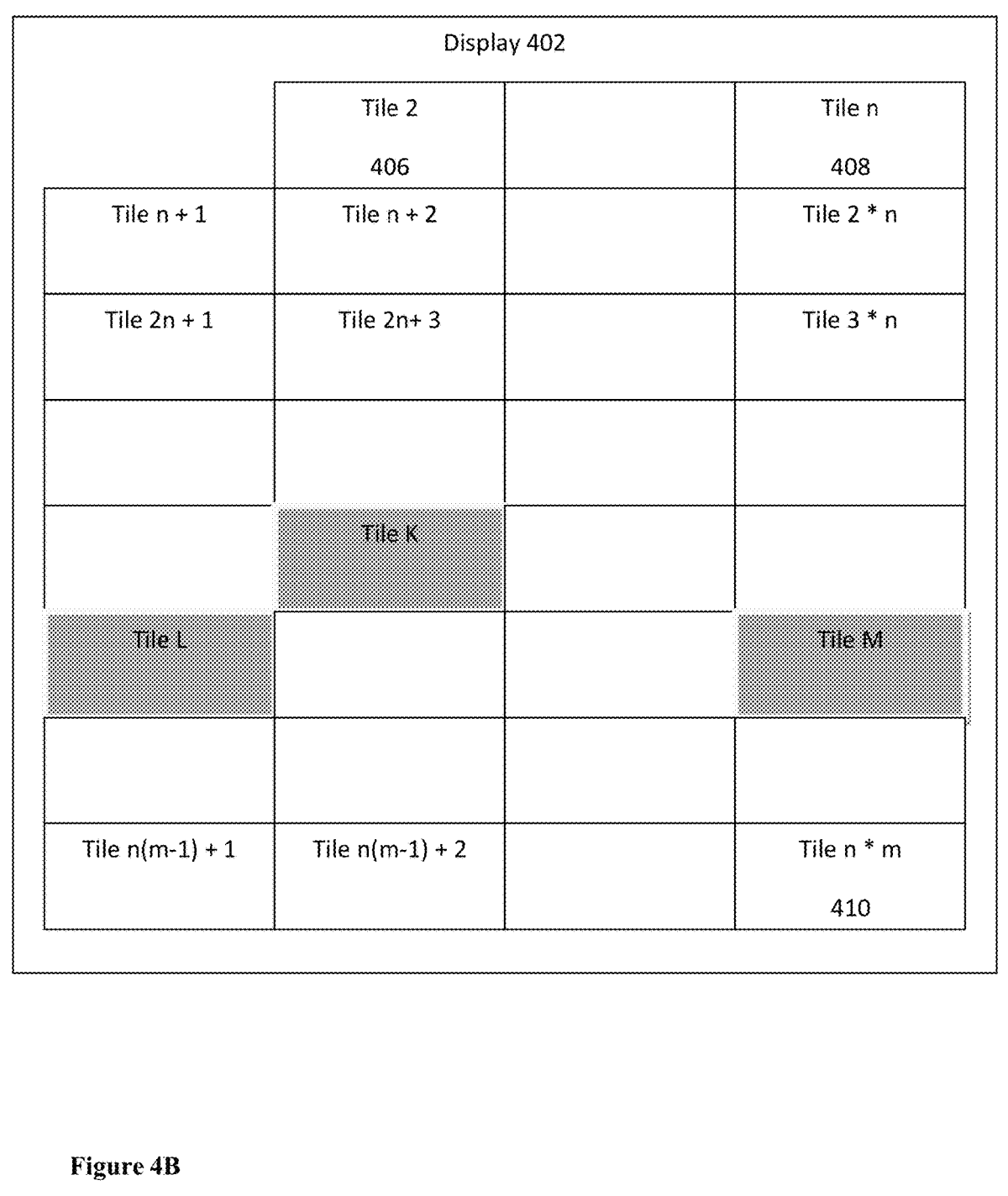

| | Display 402 | | |
|---|---|---|---|
| | Tile 2<br><br>406 | | Tile n<br><br>408 |
| Tile n + 1 | Tile n + 2 | | Tile 2 * n |
| Tile 2n + 1 | Tile 2n+ 3 | | Tile 3 * n |
| | | | |
| | Tile K | | |
| Tile L | | | Tile M |
| | | | |
| Tile n(m-1) + 1 | Tile n(m-1) + 2 | | Tile n * m<br><br>410 |

Figure 4B

SYSTEM AND METHOD FOR THE USE OF REMOTE APPS WITH A USER DEVICE

CROSS-REFERENCE TO RELATED APPLICATIONS

This application claims the benefit of U.S. Provisional Patent Ser. No. 63/422,991 filed Nov. 6, 2022 by the present inventor.

FIELD OF INVENTION

This invention generally relates to the use and control of remote executing apps by a user device and more particularly but not exclusively to a user device interactively using a remote app in varying bandwidth conditions.

BACKGROUND OF THE INVENTION

Executing a remote app on a user device is nonexclusively described in the present application, with various manners of efficient implementations. An example of such remote execution is, running a mobile app on a server in the cloud instead of running the app on the mobile device, for use by the mobile device. This allows more control for the app vendor, allows for managing BYOD scenarios and a better user experience for users with low end phones. This allows for better cyber security maintenance for the vendor by separating the app from the hands of users thereby diminishing the attack surface of the app, cloud and entire service. In the context of the present disclosure, we will discuss an arbitrary app such as a business app, which is executing remotely, similarly to how it would on a user device. The remotely executing app display information is transmitted to the end device while user commands, such as touch events, are sent to the remote app.

Since users with mobile devices are sometimes located where the network available is of low grade, such as where packet loss may occur and low bandwidth is available, achieving useful remote app usage presents a challenge due to the interactive nature of the executing app for the user.

Overcoming bandwidth limitations where the available bandwidth is sometimes lower than the required bandwidth to display the app, is presented in this disclosure. Furthermore, user commands such as touch events are handled in a manner that allows interactive user experience even if the bandwidth is lower than the required bandwidth for sending the user touch events when packet loss occur.

Keeping a useful interactive user experience even in low available network connectivity scenarios is presented while preventing experiences such as, a user making several attempts at controlling the app, user getting older reactions on the display than current ones among others. Other examples that are preferably prevented are the user getting a low-quality image, a user getting an old and irrelevant image and so on. These are prevented even as a low network connectivity is only available, such as when an order of magnitude less than the required bandwidth for streaming the app display data is available.

In a common example scenario for our disclosure, we have a remotely executing app, such as a common Android app. This app is executing in a remote server with an additional server app for maintaining communication with the user device. The user is using an Android phone, although it may be any other device, running a thin-client app for making use of the remote app. The server and the client communicate in such a way as to keep the app interactive for the user, even when in low bandwidth locations. The remote app sends image updates of its display to the user device and the user device sends user touch events to the remote app. The aim of the present disclosure is to make the experience of the user interactive and smooth, rather than laggy, choppy, slow and skipping with degraded visual display. The interactive property of using the remote app with a user device requires that the remote app currently displayed on the user device is current enough for the touch events made by the user to be relevant for the actual app executing remotely.

Streaming a video may be accomplished even in low bandwidth situations, however this is not an interactive usage but rather a static unchanging video. Remote desktop applications are commonly used in various scenarios, however their display is often of noticeable lower quality and require high bandwidth. Video conferencing apps require a high bandwidth and include some noticeable delay.

In cases where bandwidth needs to be lowered for the above cases, the display may become blurry or low grade in the case of real time video, and streaming may stop completely in case of video streaming.

However, the present application may support a requirement to display business apps that do not change very fast like moving video does, nor require the transmission of a display of an entire server console. Such apps may display a highly compressible display image to the user. These business apps should be supported in occasional low bandwidth availability, such as when using mobile devices in low reception areas. In such a scenario, the image should not become blurry but on the other hand refresh rates may be kept low. Furthermore, if display frames are lost it is useful that only the latest frame or partial frame is displayed and the previous ones that were not received be discarded.

When talking about receiving latest frames, if for example, a certain area in the display changes many times in a short period of time and then becomes static, we would not be interested in all the intermediate changes but rather in the final static image. Therefore, if we were to lose interim image frame updates, we would not be concerned about the changes that were lost. We would however, like the final static image version to be displayed to the user. This is in contrast to video and audio media, where the short-term history of the current data matter. To make out the audio the user must receive a continuous audio segment and the current audio data alone is worthless. Similarly, video contents must preserve a continuous segment of video. Otherwise, the image would skip and may even show errors and generally be unacceptable for the common user. We can relate to this property of sending current image display as discrete display image updates to differentiate the transmission from the likes of audio and video as described above. This mechanism of sending discrete current display image may present a low latency mechanism to update the current display of remote apps on user devices so that the user input events correspond to the current content of the remote apps for facilitating interactive control of remote apps on user devices. Another example is refraining from sending the parts of the display that don't change while only sending those that do.

In the present case of using business apps, the requirement that comes foremost is the interactive property of the app for the user. A remotely executing app that does not offer good interactive usage for the user, such as the user feels the delay when tapping on a virtual keyboard for example, or scrolling through messages, makes the system not useful. Therefore, in order to offer remote apps to the user, time consuming actions that would be noticeable to the user should not be used. Such a service should work also when bandwidth becomes low and packet loss is at a higher frequency, such as when using a phone in a place with lower bandwidth. Such a requirement brings forth a different problem than that which is at hand when video streaming, video conferencing or even remote desktop apps are used, where the bandwidth is expected to be sufficient or otherwise the service would not be useful or disconnect altogether.

A common setup for the present disclosure may be viewed as a remote application executing on a remote device using a remote display; a local device for making use of the remote app; a manner of sending touch events from the user to the remote app and a manner of sending image updates to the user device, working in such a way as to give precedent to the latest image data even if intermediate data is lost. This requires the most current image being displayed, touch events are current and recent ones take effect in the correct order.

It is worth noting that touch event may also be skipped sometimes, so, for example, while an action down and action up are necessary, some of the intermediate move events may be skipped.

In order to bring forth such a system as described, a reliable transmission protocol like TCP, would not be ideal because we would like to allow losses of intermediate frames so as to receive the latest ones. However, we would like the latest image to appear on the user device. A lossy protocol like UDP seems more appropriate to achieve such a system, however we need to somehow manage to receive the latest current image and correct touch events to be received even when some of the data is lost, and as well as to support low bandwidth scenarios.

For example, a user on a mobile phone is using a remote business service through the use of a thin client, transmitting the display of the remote screen in such a way as to be able to access and interact with the service even with low latency, such as when bandwidth is lower than required to fully stream the display information.

In such a use case, although this described setup may not be suitable for video conferencing, game playing or fast changing data, in the case of business applications that change relatively slowly, a low bandwidth low latency solution may be provided even when some intermediate frames may be lost, so long as the latest image is displayed as far as bandwidth permits, as will be defined in this disclosure. In a preferred implementation we would preferably like the display to be clear and not blurry.

In a simplified embodiment, the solution presented may be implemented by the steps as follows. We first limit the scanning of a remote display to an X number of scans per second. The scans are then checked for updates relative to the previous scan. If for example, we now divide the display into an equal size rectangles, only those rectangles that were modified would be transmitted, along with a serially incremental number for their version.

The device, using the thin client receives the rectangles along with their serial number and their designated location on the display, sends the server acknowledgements or acks, for the received rectangles and a resend requests for those missed. The rectangles missed may become known because of the serial numbering of the sent rectangles, where non-consecutive rectangles received means loss of the intermediately sent rectangles.

The server which knows which rectangle represents which part of the display will only attempt to resend those rectangles that are the latest to be displayed for their respective area and discard other resend requests for which a newer rectangle covering their respective area has already been received.

Furthermore, if no acks are received for the latest updated rectangles of the display after a certain amount of time, these will be resent automatically. This time amount may change and increase when no further ack is received from the device.

As the application displaying on the remote display does not change rapidly such as a video application, this manner may display a clear image of the remote display with low latency for a device that has varying bandwidth and may support low bandwidth relative to video streaming applications.

In this context we can measure the required data and hence the bandwidth for updating the current image on the user device, as the number of rectangles that need to currently be changed on the user device, without sending those rectangles that have not changed and have been acked. Even if only a partial of those required rectangles get successfully sent to the user device, the communication mechanism retries to send the leftover rectangles until they are all received at the user device. The required bandwidth is the required data divided by the time a user interaction is possible without noticeable delay.

In order to simplify the description of this described mechanism, we introduce the term 'raining' in a similar way that 'streaming' is used. While streaming requires the sending of consecutive data such as audio and video to be meaningful, we refer to raining as the method of achieving the latest current image on the display, where consecutive data is not required and may be discarded in order to display the latest image on the screen, allowing for interactive experience. In this context we may use the term discrete content to differentiate from consecutive content such as audio and video. A display may be split into parts, and each part labeled with a version number. When it comes to raining, we are only concerned with achieving the latest image part with the latest version number appearing on the display rather than consecutive data changes reaching up until the present time. The likeness to rain may be explained as a drop of rain, which signifies a modification of data to the screen. This modification is necessary and relevant only when an arriving drop A, or update, has not been superseded by another, more recent drop B, completely covering the arriving drop screen area of drop A.

In some embodiments the updates to the screen may overlap, so that the shape of the image part sent to the thin client is minimal to the current encompassing changes.

In some embodiments a support for scrolling is implemented by identifying the scrolling portion of the screen. In such a case, the scrolled area and new location may be sent to the thin client. Other modifications if any, may be updated using methods as described above. Other methods such as this may be additionally used in order to update the user display to present the currently displayed image of the remote app to conserve data communication.

Therefore, this disclosure allows a remote server to display a clear image of a display in a device with lowest possible latency depending on available bandwidth of the endpoint.

The present disclosure may be viewed as an example of an embodiment which allows the use and control of a remote executing app that supports low bandwidth so that latest display portions are up to date even if some are lost. This includes specifically the resending methods for displaying the latest available display at the fastest time so that it is useful interactively to a user. This also includes the resending of user touch gestures and/or other control means so that they are latest and relevant. The present disclosure is also presented to supports the interactive experience of the use of the remote app by the user.

Furthermore, the present disclosure may also be viewed as an example of an embodiment which allows the use and control of a remote executing app that supports limiting of the required bandwidth. This may be done for example by dynamically lowering the number of modification checks of the remote app display depending upon current available bandwidth that changes dynamically. This may be done by the detection of a change in a display or display region and measuring the number of recent updates in the last near-term average, middle term average and farther term average as measured in time units.

In an embodiment of a larger scope of the bigger picture, we can view a functionality of a system that is reminiscent of VDI or Virtual Desktop Infrastructure. VDI has allowed businesses to harness cloud computing power. Similarly to VDI, in the present application we present VAI, Virtual Application Infrastructure, to execute Android apps remotely and use them on a user device. VAI may be provided as a service which includes the entire end to end solution, starting with the execution of an app in a container within the cloud and ends in the supplying of a thin-client app for the user device to make use of the remotely executing app running in the cloud. The original app may be used, as is, for the deployment, making it seamless for the customers.

Since remote apps are interactive in nature, implementing remote execution of apps poses challenges. Controlling a remote app in real time using a device with dynamically varying bandwidth such as a mobile phone is not commonly possible today. That is because various connection oriented and streaming services are unfit for interactive purposes as they are not real time in nature causing various delays, especially when the available bandwidth is low. Similarly connectionless oriented services are not ideal as noticeable freezing portions of the display may occur in low bandwidth cases.

The VAI SaaS presented here makes use of the raining algorithm described above, to deliver the latest possible display in the app in the cloud for the best interactive experience possible given the available bandwidth of the user device. The interactive experience is the important feature, and it is a different requirement to transmitting audio and video as well as other media, as described above.

Therefore, this application has vast uses for current and future use cases among which new use cases become available due to the possibility to support occasional low bandwidth when using a remote display on devices such as mobile devices while supporting low latency and so enabling user interaction.

There is thus a widely recognized need for this technology and these services and it would be highly advantageous to have such a method devoid of the above limitations.

SUMMARY OF THE INVENTION

A system and method are presented for using a remote app in occasional low bandwidth availability while keeping low latency for the usability and interactivity of the remote app. The remote app should preferably not become blurry or cause increased latency in instances of occasional low bandwidth availability.

Furthermore, a system is presented for interactive execution of remote apps on user devices, comprising:
- a remote app cloud service configured to execute remote apps;
- a client app facilitating user interaction with said remote apps by sending user input events to control the remote apps and receiving discrete display image updates;
- a mechanism for updating the current display of remote apps on user devices, said mechanism transmitting discrete current display image data relevant to the currently displayed content by said remote apps;

whereby the displayed images of remote apps on user devices using said mechanism enable user input events from said user devices to correspond with the current content, thereby facilitating interactive control of remote apps.

Furthermore, according to one aspect of the present invention, there is provided a method of interactively using remote apps on user devices, comprising:
- a. executing remote apps in the cloud for use on said user devices;
- b. sending current discrete display image data updates of said remote apps to said user devices;
- c. sending user input events from said user devices to control said remote apps based on said current discrete display data image updates displayed by said apps on the user devices;
   - whereby interactively controlling said remote apps with said user devices receiving and displaying discrete current display data image updates from the cloud to support said sent user input events from user devices to remote apps made based on said apps images displayed on said user devices.

Furthermore, according to a second aspect of the present invention, there is provided a system for interactively executing a remote app on a user device, comprising:
- a remote app executing on a remote server that sends currently modified discrete display updates to said user device;
- said user device receiving display updates from said remote app and sending acknowledgement of at least part of said received display updates and user input events to said remote app;
- said remote server receiving said display updates acknowledgement messages from said user device and determining the current updated display data of said remote app thereby determining and sending image data updates necessary to display the current remote app content on said user device;
- whereby the displayed images of said remote app on said user device enable user input events to correspond with the current remote app content thereby facilitating interactive control of said remote app.

Furthermore, according to a third aspect of the present invention, there is provided a method of interactively using a remote app on a user device comprising:
- a. executing said remote app in the cloud for use of said user device sending currently modified discrete display updates to said user device;
- b. sending acknowledgement to said cloud for at least part of received display updates by said user device;
- c. sending display updates necessary to display current remote app content on said user device based on said acknowledgement messages and on determining current updated display data of said remote app;
- d. sending user input events from said user device to control said executing remote app based on said sent display updates displayed on said user device;

whereby interactively controlling said remote app with said user device where current display of said remote app on said user device enable user input events to correspond with current app content.

Unless otherwise defined, all technical and scientific terms used herein have the same meaning as commonly understood by one of ordinary skill in the art to which this invention belongs. The materials, methods, and examples provided herein are illustrative only and not intended to be limiting Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit or part of a chip. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 4A is a block diagram illustration of equally sized rectangles splitting up a remote display of a remote app in order to update local device display of the remote app, in accordance with an embodiment of the present invention;

FIG. 4B is a block diagram illustration of equally sized rectangles splitting up a remote display of a remote app having pending rectangle updates, in accordance with an embodiment of the present invention;

Figure 1:
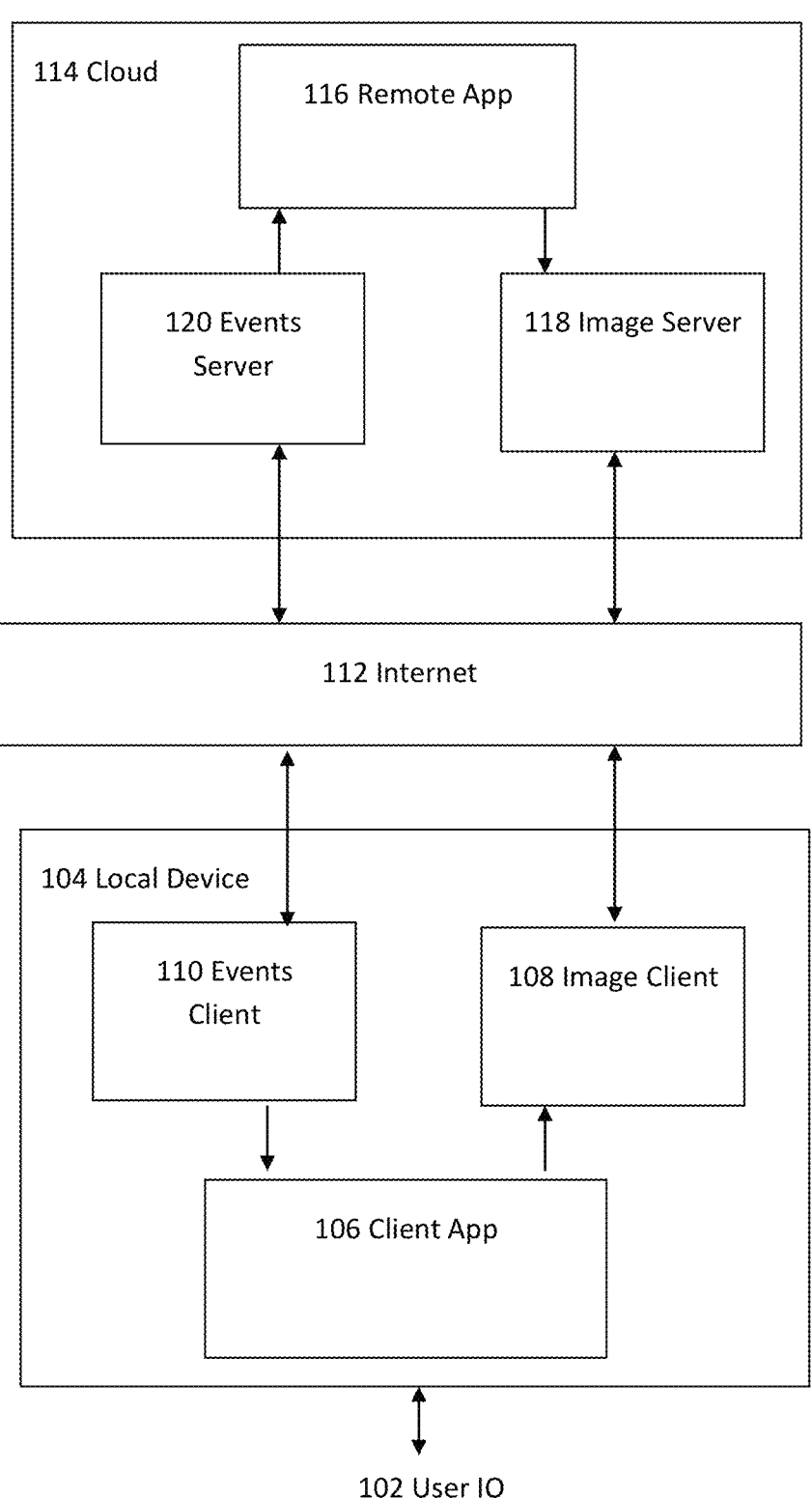
FIG. 1 is a block diagram illustration of a user interacting with a remote app using a local device, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach a system and method for user interacting with a remotely executing app in different environments such as an environment of varying available data bandwidth.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized for interactively using a remote app in varying data bandwidth and when data bandwidth is low.

An application or app is remotely executed, in part or in whole, for example in a container on the cloud. The user may connect to the executing app via a local app such as a thin client, and interact with the app through the local app.

Sending the current display to the remote user may become choppy at times, depending on bandwidth availability, however, we would like at all times that the latest possible image or sub image will be displayed. This may include a mechanism to send acknowledgements and to report missing images. This mechanism may not mandate all images are received but rather that the latest one is displayed. Therefore, if image numbers 1, 3, 7 and 10 were received when images 1 to 10 were sent, the server would not resend older images when a newer version is displayed. Now if image 11 is now sent to the user device and is not received, the server resends it until it receives and ack that the latest image number that is currently displayed remotely on the remote device or remote virtual device. This is an algorithm that is closer to UDP that allows for losses of frames but reminiscent in part, of TCP as it makes sure the latest image or sub-image is received by the user device.

In a preferred embodiment lossless images are sent in order to prevent grainy or unnatural display image. In such embodiment, in a low bandwidth situation or changing situation from high to low bandwidth, the latest image will be displayed rather than streaming in low quality video to support low bandwidth.

In a preferred embodiment, the interactive feature of the present disclosure prevents the use of algorithms that require a long time to encode the display data in a manner that a human notices the delay. If we also allow losing frames then the present streaming mechanisms do not fit the requirements, specifically when we require a non-grainy, high quality image and preferably with lossless encoding.

In a preferred embodiment the communication protocol between the remote executing app and the user device is updating the user device with the latest app display image or sub-image available, rather than changes leading up to the image. This mechanism may include acknowledgements and missing messages requests.

In a preferred embodiment the displayed image is split into sub images, allowing to send only parts of the display that has been changed. In other embodiments, only modified portions or relevant parts of the image may be updated to conserve bandwidth.

In a preferred embodiment and as an improvement, if a portion of the current display reverts back to a recent image that was used previously, this may be detected by the server and a notification may be sent to the client rather than resending of the actual image. The local client may keep some of the previous image portions and present them if required.

In a preferred embodiment, scrolling of screen up and down or sideways, may be detected and transmitted to the client. Therefore, updating of the display may be required only for the previously unobserved portion of the screen. In some embodiments the memory for scrolling may be retained, extending the available screen data so that scrolling of the image previously observed can be locally scrolled to the correct location.

It is preferred that applications may be business app that do not change very often like video media for example, and where the app is driven by the user interaction with it, having a display image that is commonly highly compressible, preferably using lossless compression.

In a preferred embodiment, events sent by the user, referred to as user control events or user input events, are only sent when they are relevant and no attempt is made to resend them after a certain time, as these may become not currently relevant.

The above suggest a way to interactively use a remote app. A manner that differentiates protocol wise as well as image manner of encoding to commonly used protocols and encoding. A protocol between a user device and a remotely controlled app that supports the interactive use of the app from the user device is useful yet a different use case from video or music streaming services or interactive video calls that may not work well in low bandwidth situations.

A preferred embodiment is described using a remote server running android apps. A user device runs a client for communicating with the remote app. When the user touches the display, the corresponding touch events are sent to the remote app. As the remote app changes, images or sub-images of the changes are received and displayed to the user.

It is essential that the updates of the images are such that the latest is displayed. Furthermore, touch events should be relevant and current to the app running in the remote server.

In an initial embodiment, to support such requirements we may detect changes to the display and send the modified display parts to the user device. The user device acknowledges the reception of the changes to the server. The touch events sent from the client device are sent to the remote server and into the remote app.

In the initial embodiment there is no handling of packet loss so it may be implemented on a reliable protocol like TCP. However if many changes occur and a low bandwidth situation occurs, the app would get stuck, waiting for all the display updates from the remote app. Things get worse when the user attempts to control the app through touch screen and events start piling up.

In order to keep the app interactive, it is essential to work differently so that the user is interactively controlling the app even in such low bandwidth situations. Therefore, a protocol based on datagrams such as UDP is used in a preferred embodiment, while a mechanism is implemented in order to make sure that on the one hand, the latest image possible appears on the user device, and on the other hand important touch events and their order are being sent to the remote device, so the wish of the user gets conveyed to the app.

This description explains the difference between the commonly used remote desktop, video conferencing software and video streaming and the use case of interactively using remote apps.

To break down and explain the system for remotely using apps as explained in the present application, we need to solve the data transmission required to display on the user device and the touch events being sent from the user device to the remotely executing app. We will then add extra features that allow to improve the interactive feature of the system.

In order to display the most current image to the user we will now take a simplified situation and then build on that. We split the screen to n*m non overlapping rectangles. For each rectangle we keep a current version number for that rectangle. When a change is detected in the image displayed in the remote app, we find which rectangle of the n*m rectangles has been modified. We then send only the modified rectangles to the user device. Each modified rectangle is also numbered with a serially incremental number, so that each message is incremented by 1.

When a rectangle update is received on the user device we send an acknowledgement for that rectangle, which we will shortly refer to as an ack. Since the user device knows the latest rectangle received so far and their corresponding serial number, any numbers between that number and the next received rectangle serial number has been missing. The user device then sends the missing rectangles or messages to the server. In case where the latest one or more rectangles did not arrive to the user device, the remote app server which did not receive expected acks resends these rectangles and may keep resending them with varying time delays until an ack is received or that these rectangles become irrelevant, as more recent ones for that specific location on the display are received.

When the remote app server receives an acknowledgement message for a rectangle, it is marked as received. When a missing message of a rectangle is received, the remote app server checks which rectangle location that rectangle is covering. If a more recent rectangle for that display location on the screen has been received by the user device, or if a newer rectangle is available for that display part of the screen, that missing message is dismissed. However, if the missing message represents the latest rectangle that is displayed on the display for that display area, then that rectangle is resent.

A timeout mechanism retries to resend unacknowledged and failed rectangles which are currently displayed and have not yet been acknowledged. This timeout mechanism may initially retry to quickly resent the rectangles and later wait more and more between resends.

In this manner, even if rapid changes appear on the screen and following that the screen is static and unchanged, the latest static image will be displayed on the user device even if multiple intermediate rectangle updates were missing in the steps leading to the currently displayed image on the remote app.

Offering the interactive property of the displayed image may be accomplished by several factors. One factor is the rate of display change. In some embodiments the display may be polled several times a second therefore limiting the number of polled display scans may limit the bandwidth required to transfer the image to the user device. In some embodiments the display change may be triggered by the display itself, triggering an interrupt or similar event that signal an update of the display. In such a case, the rate of update may be limited to a certain number per second. This may be implemented by placing a dirty flag and a timestamp for each time a change event is triggered. Using a timer, a thread may wake up at the required rate and check the dirty flag and timestamp to determine that a change has occurred and only then act upon the update.

Another factor for implementing the interactive property of the displayed image is the communication means, deciding whether changes are sent to the client device and whether they are to be buffered serially as well as the current bandwidth available. If we use a UDP or datagram oriented protocol to immediately send updated rectangle displayed on the remote display, if we limit the number of display scan changes, something that may occur dynamically, then even in low bandwidth, allowing only for a fraction of the total rectangles making up the display to be received every second by the user device, we are able to receive the currently displayed image of the remote app on the user device, allowing intermediate rectangles to be lost. In this way we can offer interactive capability for remote operating apps in the sense that the user sees their interaction as quickly as possible per the bandwidth available and the required total rectangles that actually change on the display, and without requiring the change history of each rectangle on the screen that changes. The latest image is the requirement rather than the consecutive data that matters, such as in speech and audio. We may use the term discrete content or discrete display images to differentiate from consecutive data as mentioned.

We use the term 'raining' to describe the data transmission criteria for achieving a useful operation of the present system, as the latest rain drop that matters. This is in similarity to the term 'streaming' when consecutive data is required for audio or video to be useful. For example, if a frame of audio is received every half a second, that would be useless as the audio would not be legible. However, if a small image modification of the present image on the display is received every half a second, and that image modification completes the currently displayed image of the app, such as when text is typed into a text field and the rest of the display is unchanged, then that update may allow for the remote application to remain interactive and therefore useful. To continue the example, the update may reflect several characters modifications in several rectangles appearing at once, but that keeps the interactive property of the app. There may have been several changes within the updated rectangles, but only the latest ones are required, rather than the sequence of the rectangles leading up to the current image displayed to the user. For example, a user types fast and some of the intermediate updates are missing. The term raining reflects the property that the last drop of rain, or the last updated rectangle, is the one that is required. The previous rectangles occupying the same area as the latest rectangle are not useful anymore and should not be sent or resent if not received by the client.

As for the touch events from the user device to the remote app, these too may be sent in UDP or datagram like protocol. There may be no requirement for a backlog history and the current touch events are the ones to count. Note that there is a consideration of keeping a group of latest events in the correct order and certain events should not be skipped such as action down or action up. We refer to older gestures that are separate to the current one and are older than a certain number of seconds that may be determined by tuning the system.

If we only use UDP for example, some lost touch events may be crucial, such as a missing action down, action up or cancel. To solve such a scenario, we may again use an ack message from the remote app to the user device, placing serial numbers in the touch messages. In a preferred embodiment we give more attention to such events as up, down and cancel for example. So, if such important event occurs, we send it and until we receive an ack for it, we continue to send it along in the following touch messages, along with the latest touch events, such as in a concatenated manner. We can do that because these touch events take little data to send. For example we can send a message from the user device to the remote app that includes <down at 10, 20> <move to 10, 21> before the down message is ack-ed. We send a serial number along with each touch event, so we know not to repeat it. We can also continue to piggy-bag older messages on the new current message where we only use the important messages so for example, <down at 10, 20> <up at 11, 21> <down at 100, 200> <move to 101,201>.

We may also add the time of occurrence of each touch event so that we may lose some back log as time passes by and so that when connection resumes, we don't overwhelm the remote app with a large number or touch events.

However, if connection is available, although at low bandwidth, we are still able to maintain good interactive usability for the user, which is the aim of this disclosure. This is due to the fact that although some intermediate move commands may be lost, our overall touch mechanism is reported quickly and reliably.

As explained above regarding the image updated on the user device, as well as the touch events from the user device to the remote app, even in low bandwidth situations we are able to offer interactive usability for the user using the remote app.

We may now make improvements to the preferred embodiment. Some examples of improvements may be screen scrolling identification by the server and notification and implementation by the client, switching between current and previously displayed rectangle by only sending an indication of that event instead of the actual change and so on. We can also use lossless image formats or lossy image compression depending on bandwidth availability.

Furthermore, as brought in the example of the rectangles above, if a rectangle update needs to be sent but only a small amount of it has actually changed, we may use a better implementation, such as identifying the modified portion and sending only that part as an update.

In this manner the user receives control and usage of a remote app with the best interactive experience possible based on the current bandwidth available.

One of the reasons for executing an app remotely is that it offers many avenues of attack for the attacker. Having the app execute on the cloud while only allowing user interaction such as touch events to reach the app, may ease the ways in which the app owner is required to protect their environment, such as recurring penetration testing and so forth. This may help solve the BYOD problem where users may use their devices which are uncontrolled by the app owner and may cause security vulnerabilities. Furthermore, moving the endpoint to the cloud continues the trend of simplifying deployment using the cloud to also cover the endpoint, allowing the service provider easier service setup, more control, simpler expansion of service and easier ways of meeting regulation requirements, and security check ups when everything is in-house. The only communication necessary from outside the cloud may now be received touch events into the cloud and sending out image parts out of the cloud. That communication may be easily monitored and separated completely. In some embodiments a firewall for touch events may be implemented to check abnormal touch events received from users.

App owners may be able to offer additional functionality such as allow access to sensitive data to be used in their app when the app is executing in a cloud and not on the local machine because it is resembling cloud security rather than endpoint security, which is usually much harder to control and keep tabs on for the app owner.

The app may be running in a cloud environment within a container, so that different apps are separated well between different users. The image data displayed to the user should be highly responsive for the user, and this is a key issue for users to be able to use the app. If the user experience of the app is lagging and slow to response the user will not want to use the app.

The present application presents a way to minimize app reaction time in several ways. Several shortcuts may be used instead of heavy lifting video encoders that are very useful for one-way video streaming but are not very good in reacting to a user in real time and dynamically changing bandwidth with occasional lower bandwidth that required by the encoder. One way is to remove the requirement for receiving the changing of the data that is required in audio and video apps, and rather require the latest possible image only. Furthermore, the present application in one embodiment uses an X11 X windows system approach for a single app, so that a certain portion of the display being modified only effects that portion and does not require the entire display to be sent again. Other modifications to this approach include identifying of the scrolling of image blocks to recreate the movement of the blocks in the endpoint device. Another modification may be the possibility of reverting some parts to a previous image or state.

A typical setup for running a remote app in the cloud includes the injection of incoming touch events or mouse and keyboard events, as well as the updating of image data from the app to the endpoint. On the endpoint device side, a local app, a web app or thin client or others may be used, in order to communicate with the running app in the cloud, sending touch events to the app running in the container in the cloud and receiving updated image data to update the image that is displayed on the device.

We will use an image and touch events in the present disclosure, but other input and output devices may be used ranging from keyboard and mouse to a Neuralink chip that is implanted in the brain.

A VAI, or virtual application infrastructure, may put everything together into a single product that may be provided as a service. In an embodiment of the present application, a service provider offers VAI SaaS. A cloud service company wishing to offer its services provides their app to the VAI service provider. The service provider may configure the app for the users of the cloud service by providing their thin client configured to run the app of the service provider and the app may include the icon of the service provide app. When a customer of the cloud service runs the app, the app executes in a container in the cloud for that user. Touch events are sent to the remote app and the remote app sends image updates using the raining algorithm to the user app keeping the app interactive, while supporting the user device available network bandwidth. The VAI service offers an extension to existing cloud infrastructure offering the next phase in cloud computing by eliminating the endpoint and including it in the cloud. This may offer a cloud service having no direct communication with outside the cloud.

The advantages of using VAI are vast. Here are some examples. It is easier to start a cloud service deployment when your endpoints are in your cloud and under your control. Meeting regulations and security requirements becomes trivial for the entire service. Lowering cost of execution due to the savings in maintaining regulations and security as well as upgrading, managing communication bandwidth of cloud to endpoint. Controlling the deployment in full in terms of API, communication and upgrades. The next step phase in cloud computing evolution brings a new way of controlling, managing, growing and securing cloud deployments.

A VAI deployment may enable remote workforce usage, allowing the use of the user device for working remotely. There is no need to allocate company devices for external employees; no need for special IT installations or using special device modes; no need to trust remote employees with company data; allowing BYOD without compromise and fully embrace the gig economy.

A VAI deployment may impact end users allowing private centric services to be more easily available online because the endpoint runs in the cloud. Furthermore end users, may freely communicate without fear of retaliation, such as in semi-democratic countries. That is because no app data may be communicated or stored on the user device as only current image is displayed.

The VAI SaaS may operate based on user requirement. If more than a certain threshold of number of users has been reached on a specific cloud server, another cloud server may initiate and start service to offer more customers use the app remotely. Likewise, when demand is lowered, a cloud service may shut down unused servers.

Reference is now made to FIG. 1, which is a block diagram illustration of a user interacting with a remote app using a local device, in accordance with an embodiment of the present invention comprising local device 104 having a display which is a touch sensitive display displaying at least some of client app 106 which has display data. A client app may be a thin client, web app or other means of interacting locally with the user as a proxy for using the real application executing in the cloud. User interacts with the client app 106 using user IO 102 receiving app images on the local device display using image client 108 and inputs touch gestures on touch sensitive display which are sent to event client 110.

The app that the client app 106 represents is not running locally on local OS but rather running in the cloud 114 as remote app 116. The remote app 116 executes in the cloud and has display data. Image server 118 in the cloud sends image data of the running app 116 to be displayed on local device 104 using image client 108 in the local device 104. The data may be sent through the internet 112 or some other network preferably in an encrypted form.

The user interacts with the remote app 116 using the touch screen on local device 104. The user gestures on the touch screen display are received by event client 110 in the local device and sent to the remote app 116. This is done through the internet 112 or other means, received by event server 120 in the cloud and sent on to remote app 116.

The remote app image server 118 handles the outgoing remote app image updates. In a preferred embodiment the remote app image server 118 splits the image into sub-images and only sends those sub-images that include changes from previous images. In a simplified embodiment, the display is split into n*m rectangular tiles. See FIG. 4 for more details. Each tile gets sent immediately if it is different than the previous tile image of that location and if a certain threshold of updates has not passed. See FIG. 2A for more details.

Each message the image server 118 sends is preferably serially numbered. The image client 108 in the local device sends acks or acknowledgements for the images it received, and sends miss messages for the messages missed between the acked messages, according to their consecutive serial numbering. The remote app image server 118 may receive the acks and miss messages from the image client. The server will not resend image parts of images which have been covered by a later version rectangle tile. The server only resends image parts which are the latest to be displayed for that rectangular tile. See FIG. 2B for more details.

The remote app image server 118 also has a mechanism to periodically check the tiles to see if they are all currently acknowledged (or ack-ed). For example, if the last message was not received by the client 104 or the ack was not received by the server 118.

The image client 108 in the client device works in conjunction with image server 118, handling incoming image updates by painting them to the display, sending acks of the received images and miss messages for those messages lost between the two received recent messages, with the help of their respective serial numbers.

In this manner the remote app image server 118 makes sure the latest image is displayed on the client device 104. The server preferably makes use of a lossy non-connection based network protocol which may lose some messages, so that it may be most interactive for the user of the client device.

The remote app event server 120 handles the incoming touch events or other type of input events, for the remote app. This server 120 works in conjunction with the local outgoing touch events client 110, sending acks to the received events and miss to the events missed. This is made possible by serially numbering the touch events and sending the missing events between the latest events. The events server 120 may hold and wait for messages for a certain time if one or more messages have been missed. In some embodiments a wait for a missed message only occurs when a major event is missed, such as a down action, up action, and action cancel but not move action. In some embodiments, un-acknowledged major events may be piggy bagged onto the current message, as such events are usually short in content to send. See FIG. 3 for more information.

In a preferred embodiment the local outgoing touch events client 110 periodically checks for acks of events and resends events if they were not acked after a certain time. In some embodiments resending of events is made less frequent as events are not acknowledged after longer time duration passes. Retries may stop altogether after a certain time as they may no longer be relevant.

In this manner the local outgoing touch events client 110 makes sure the latest touch events of the user are received by the remote app executing in cloud 114. The events client 110 preferably makes use of a lossy non-connection based network protocol which may lose some messages. Such messages such as the action move messages may be skipped for example while still retaining the complete action as gestured by the user. The aim of the events client 110 and matching events server 120 is to obtain the most interactive experience for the user of the client device, rather than prevent loss of event messages.

Please note this embodiment is using touch events for input events but any other types of input, from mouse and keyboard to a Neuralink chip would work as well. Similarly for images, other media types may be used and displayed in various ways than display, such as virtual reality glasses to Neuralink chips.

The interactive quality of using the remote app is achieved by working towards minimal latency along with the no requirement of history or section of time property as described above. The minimal latency may come at a cost of lower image quality and missed frame updates or portion of frames updates, based on the bandwidth available, network error rates etc.

In an embodiment of the present application, the remote app server receives various acks from the client app and received current updates from the running app. The remote app server decides which data such as updated tiles, to send to the client app based on the current image updates and the image on the client app as received through the acks and misses. Please note that some acks and misses may not reach their destination since the messages may be sent through a lossy protocol, nevertheless that would mean updating tiles that were already sent.

In an embodiment of the present application, the remote app 116 is used through a web browser as client app 106. The web browser or web browser app is responsible for sending the I/O events and displaying the image of the current remote app 116 to the user.

Figure 2A:
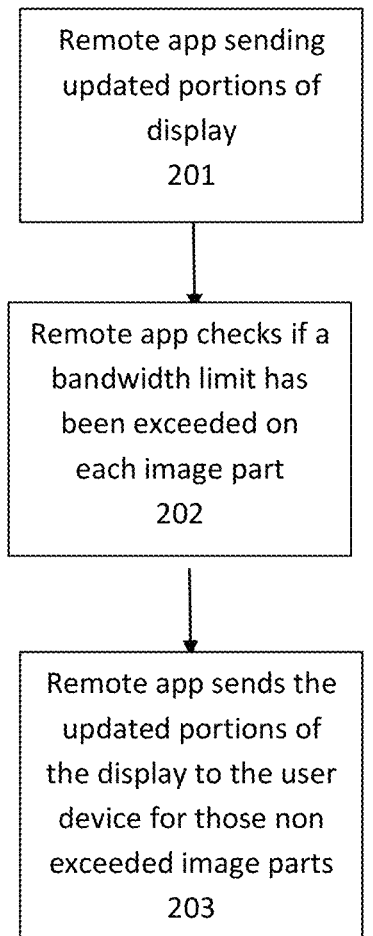
FIG. 2A is a schematic flowchart for steps carried out for updating the remote app image to the user local device, in accordance with an embodiment of the present invention.

Reference is now made to FIG. 2A, which is a schematic flowchart for steps carried out for updating the remote app image to the user local device, in accordance with an embodiment of the present invention;

In step 201, the remote app sends updated portions of the display out to image server 118 in the cloud. As described in FIG. 1, the display handling is preferably handled using an external server such as remote app image server 118. The server may be checking for updates of the display in various ways, such as display interrupts, manual checking or any other kind of checks which may be implemented using GPU or other means, which finds a difference in the current image from the previous one. In a preferred embodiment the display is split into portions and only the portions with changes are sent out. In another embodiment the changes themselves are sent only. There could be numerous ways to send image updates of parts of the display.

In step 202, the remote app checks if a bandwidth limit has been exceeded on the image parts that have been updated. The image server 118 checks it in a preferred implementation. A bandwidth limit may be defined based on a predetermined minimum time between updates that are sent for certain apps. Another example is to dynamically set a limit for the minimum time between updates depending on each rectangle recent change history. If a rectangle changes rapidly we may wish to increase the time between updates for that rectangle. In a preferred embodiment, in case where a bandwidth limit has been exceeded, that portion of the display is updated locally but not sent to the local device. This is in order not to use much bandwidth or go over a certain threshold. The exceeded portion in the current embodiment may be waiting on a timer, of which if no other update to that portion occurs, is sent when the timer expires. However if another update arrives before the timer expires, it replaces the updated image in memory while the timer continues to count down until it expires. It then sends the most updated image part available for that display part.

In step 203, the remote app image server 118 sends the updated portions of the display to the user device for those updated image parts that have not exceeded their maximum bandwidth usage.

Following the reception of the image parts by the local device using the local incoming image client 108, it sends acks of the received images to the remote app image server 118. The images are preferably serially numbered so any gap in numbering is reported as missed messages to the remote app image server 118.

These series of steps display how a remote app may display its current screen image to a user device in a manner that saves bandwidth, supports datagram communication such as UDP and therefore enables the remote app to be interactive for the user.

Figure 2B:
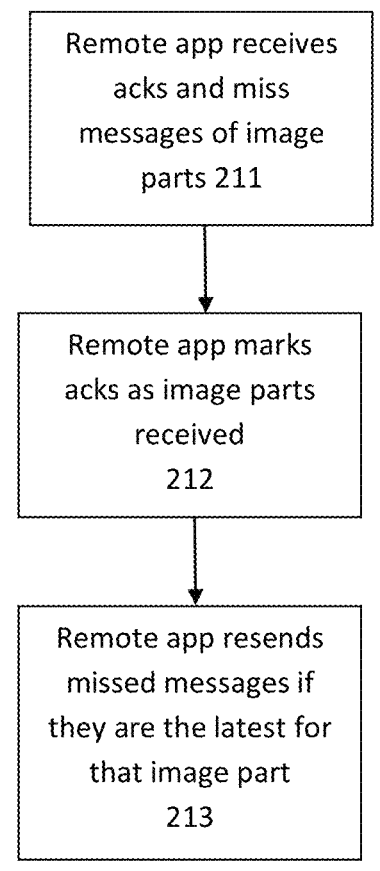
FIG. 2B is a schematic flowchart for steps carried out for managing a datagram based communication to update the remote app current displayed image to the user local device, in accordance with an embodiment of the present invention.

Reference is now made to FIG. 2B, which is a schematic flowchart for steps carried out for managing a datagram based communication to update the remote app current displayed image to the user local device, in accordance with an embodiment of the present invention;

In step 211, the remote app image server 118 receives the acks and miss messages sent from the user device as specified in FIG. 2A. As explained above, received images are acked and the images are preferably serially numbered so that missing images may be detected and requested to be resent.

In step 212, the remote app image server 118 marks received ack messages as image parts that have been successfully received.

In step 213, the remote app image server 118 checks if a miss message that had been received by the remote app image server 118, carries a request for a resend of a display portion that is now obsolete. This happens when a newer image portion than the one requested has already been generated for that specific image portion.

The server 118 for the remote app resends missed messages to the user device, only if they are the latest available image for that image part.

These series of steps display how a remote app may display its current screen image to a user device in a manner that saves bandwidth, supports datagram communication such as UDP and therefore enables the remote app to be interactive for the user.

Figure 2C:
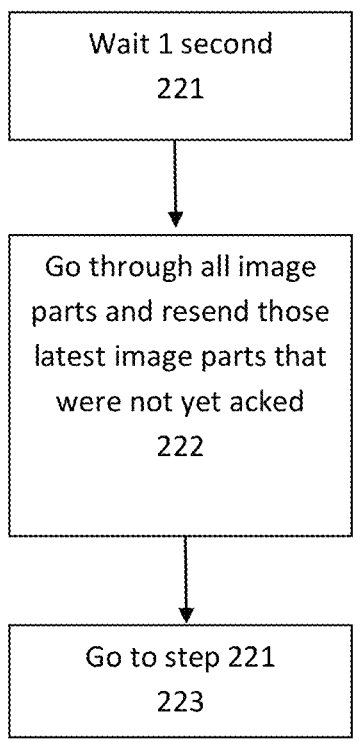
FIG. 2C is a schematic flowchart for steps carried out for routinely checking the remote image that is displayed on the local device, in accordance with an embodiment of the present invention.

Reference is now made to FIG. 2C, which is a schematic flowchart for steps carried out for routinely checking the remote image that is displayed on the local device, in accordance with an embodiment of the present invention;

In step 221, a process at the image server 118 waits for 1 second, the time may be different than 1 second and it is used as an example. This time should be larger than the ping time, since the messages need to travel back and forth to be acknowledged.

In step 222, remote app image server 118 goes through all image parts and searches for those image parts which have their latest image update not yet acked by the user device. In such a case such image part may be resent to the user device unless some limit has been exceeded, in which case this may wait for future process cycles like detailed in step 202.

In step 223 we go back to step 221.

These series of steps display how a remote app may display its current screen image to a user device in a manner that saves bandwidth, supports datagram communication such as UDP and therefore enables the remote app to be interactive for the user.

These series of steps of FIGS. 2A, 2B and 2C display how a connection between the remote app and the user device may enable the transmission of the latest image from the remote app in such a way as to receive recent image on the user local device which allows the user to interact with the remote app with low latency.

Figure 3:
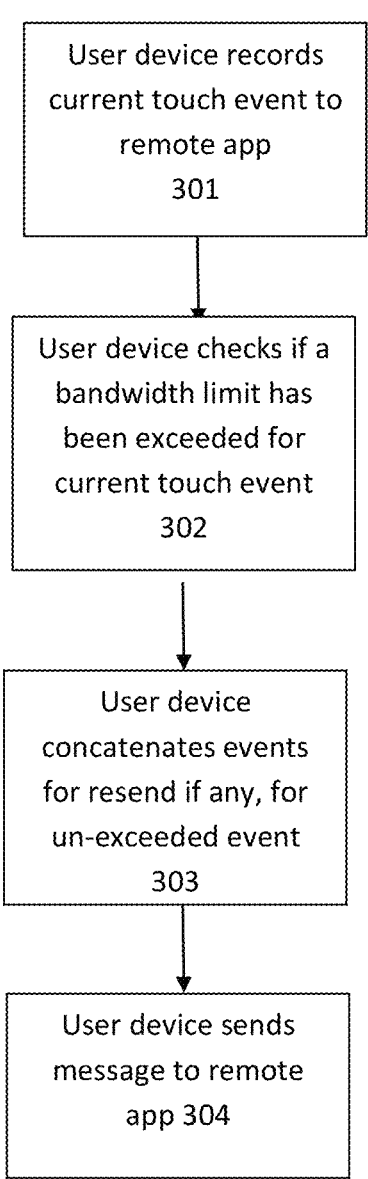
FIG. 3 is a schematic flowchart for steps carried out for sending touch events from a user device to a remote executing app, in accordance with an embodiment of the present invention.

Reference is now made to FIG. 3, which is a schematic flowchart for steps carried out for sending touch events from a user device to a remote executing app, in accordance with an embodiment of the present invention; In step 301, user device records current touch event to send to remote app.

Please note user device is used as terminology but may be a client, a web client, an app etc. Furthermore, touch events are used as an example but other such interactive commands may be transmitted, from keyboard and mouse to Neuralink chip implanted in the brain. Touch events are an example from commonly used devices. The touch events are sent to the event client 110.

Please note the terminology 'user device records', 'user device checks' etc, are meant as programs, apps, or processes in apps and this is a simple descriptive language.

In step 302, user device checks if a bandwidth limit has been exceeded for current touch event. This may occur for example if many touch movements are recorded over a short period of time. In a preferred embodiment, the event client 110 checks if a bandwidth limit has been exceeded for current touch event.

In step 303, user device concatenates events that may be required for resend if any. Such events to be resent may be events such as action up or action down touch events or some few intermediate action move events. Such events which were not yet acknowledged (or acked) may be concatenated together with the current event so that meaningful stream of touch events may be received by the remote app when an unreliable method of communication such as UDP is used. Such events are sent for events that have not exceeded a threshold as mentioned in step 302.

In step 304, user device sends the prepared message to remote app.

As a remote app, or remote app event server 120 receives the touch commands, they are passed or injected to the actual remote app 116 in the correct order. The received touch events are then acknowledged (or acked) to the user device by the event server 120.

In a preferred embodiment the touch events are time stamped. If a connection loses many touch events over time and a time gap begins to accumulate, the local user device touch events client 110 may decide to skip a certain time duration of events. Similarly the events server 120 may decide to do so.

In this manner touch events are sent close to the time of their occurrence to the remote app in a datagram sending fashion such as UDP, and together with FIGS. 2A, 2B and 2C allow for an interactive experience using a remote app over a low bandwidth and lossy network.

Reference is now made to FIG. 4A, which is a block diagram illustration of equally sized rectangles splitting up a remote display of a remote app in order to update local device display of the remote app, in accordance with an embodiment of the present invention comprising display 402 split up into equally sized rectangles we also call tiles. The tiles are numbered from Tile 1 404 on the top left hand side, next to it tile 2 406, followed by more tiles until tile n 408. The following lines are continually filling with rectangle until the last one, tile n*m 410.

In a simplified embodiment, the display is split up into n*m tiles as described and each tile is updated separately. A tile may include the tile number, and the version of the current image displayed. The remote app using image server 118 sends the image displayed in each tile, whenever that tile is modified, except for such cases as bandwidth exceeding criteria, as explained in FIGS. 1 and 2. Each tile may have a version number as mentioned above, so that it is possible to communicate the latest version of the tile and ignore old tiles received, as well as to modify resend requests for old tiles to send the newer version when it had not yet been received.

In this manner and in conjunction with images 1 and 2 it is possible to update the remote app display to a user device as fast as bandwidth permits, such that we always have the latest image of the remote app to appear after a maximum measurable amount of time depending on the bandwidth available. This is the property of the raining mechanism that, as a result, enables the app to be interactive for the user. A reason for that is due to the fact that only the latest image displayed is required and there is no need to display transitioning or changing data, such as in movie or sound.

Together with image 3, user touch events communication, the remote app becomes interactive for the user by responding to the latest events and ignoring old ones, specifically old images.

Reference is now made to FIG. 4B, which is a block diagram illustration of equally sized rectangles splitting up a remote display of a remote app having pending rectangle updates, in accordance with an embodiment of the present invention comprising similar to FIG. 4A and in addition having 3 rectangles shaded, marked as tile K, tile L and tile M, that require an update to the remote user device.

The remote app display has changes relative to the image that is present on the user device that are only included in these 3 tiles and therefore only these need to be sent to the user device. As mentioned previously, the communication protocol described between the remote app server and the user device client allow the knowledge of the current displayed tiles at the user device. The remote app server discovers there are differences that need to be updated in the following rectangles, K, L and M.

Now suppose the images are highly compressible as is the norm in business apps, and suppose each tile is of an average of 10 Kbits of data, the total of 30 Kbits needs to be sent to the user device. Now suppose we consider an app interactive as changes that occur in 100 milliseconds including resend attempts, and suppose we have 30 milliseconds latency between the remote app and the user device, that means we need to get these tiles in 70 milliseconds. That means we need roughly a bandwidth of 400 Kbps. Since 4G networks typically offer 2 orders of magnitude above this and 3G an order of magnitude over that, we can offer an interactive experience even in low bandwidth scenarios. Using Wi-Fi and 5G which offer better bandwidth should therefore improve the experience.

Since we are not sending those rectangles that have not changed on the user device we can offer an interactive experience even in low bandwidth areas. Even if only a partial of those required rectangles get successfully sent to the user device, the communication mechanism retries to send the leftover rectangles until they are all received at the user device. The required bandwidth is the required data divided by the time a user interaction is possible without noticeable delay.

If we limit the allowed number of times the display changes per second at the remote app and only send the final image displayed each time we check the image, we may control the overall maximum bandwidth required to keep the user device with the latest image of the remote app and allow the app to be interactive as if it is executing on the user device.

There are scenarios that may allow the use of screen scrolling or the use of older version of tiles as well as additional ways of conserving data for being sent in common app usages. For the example of scrolling, if a screen scrolls, the remote server may display that due to having the touch events along with the image difference. In this case, the scrolling data may be sent along with only the required data to fill in the new area discovered. In some embodiments the size of a screen larger than the actual screen may be stored for the purposes of saving of data communication.

In case where the bandwidth is lower than required, some of the rectangle tiles will fail to arrive. If in the meantime those tiles have been updated, those old tiles would not get resent. Therefore the system allows the interactive property overall and gives an interactive experience as far as the bandwidth permits without sending all the modified changes in the interim, to the user device.

In order to tell a tile has been modified it is possible to check all the data in that tile. Another possible way is to use a hash function and compute a hash comparing to the previous one in a simplified manner. This way it is possible to go back to other images that have displayed previously, in cases such as a recurring change. In another example, in order to detect scrolling a hash may be used similarly for smaller tiles down to a line.

In a preferred embodiment it is possible to dynamically modify high bandwidth requiring apps by identifying tiles changing rapidly and delaying their update by, for example, 5 ms, then 10 ms and so on, so that the user device is not flooded and the bandwidth requirements are kept low. This can be changed dynamically using the communication protocol between the remote app server and the local user device client app, where if packets are acknowledged by the user device and small amounts of resends are requested, a higher bandwidth may be allowed, while if there are many resend requests at a lower bandwidth area of the user device, the bandwidth is lowered by the remote app server as described. In this manner it is possible to dynamically offer the best interactive user experience to using an app remotely, depending upon the currently available network quality at the current location of the remote device.

In a preferred embodiment, the image updates that are sent from the remote app to the user device, some through some internal intentional delay to minimize bandwidth requirements, and those that need to be resent as they were not yet acknowledged by the user device, represent the latest and currently visible data of said remote app display. Otherwise these updates will not sent.

In a preferred embodiment, latency is more important than actual bandwidth available so that if the bandwidth is not sufficient to transmit all the remote app display image data changes, the user may still use the remote app interactively while some intermediate updates are skipped or are not received and not resent on purpose, as a newer version exists. That new version may be sent instead or it may have already been sent or will soon be.

In cases where a momentary loss of signal occurs, the system is able to cope with the situation both on the image update side and the user commands side as described above. On the image update side, as soon as data communication is available again, only the updated portions will try to be resent, in contrast to the entire modifications that occurred until now and the period of time missed by the user device. These in a preferred embodiment are not sent altogether, only sending the updates and knowing through the communication protocol which packets arrived at the user device and using that knowledge to minimize the updates to the display image. On the use commands side, as explained, newer commands may be added to new commands send, especially if these are important commands that have not been acknowledged, such as down and up youch commands or other important commands. Some events such as multiple move events may be dropped. In some embodiments, following a certain time, older events get ignored and are removed. Similar handling may occur when a longer loss of signal is encountered.

The present disclosure is different to video and streaming as in the preferred embodiment we display the latest possible current still image, discarding the previous changes. The present embodiment may be viewed as the remote app server unreliably sending image data updates to the user device. The server understands what was received and deduces what needs to be resent. This is in a difference to video as it needs to be compacted differently, as we have a different use case and therefore a different approach. The approach in some embodiments may be summarized as displaying the latest image on the user display and keeping important user commands in order thereby keeping the interactive property.

In this manner and in conjunction with images 1 and 2 it is possible to update the remote app display to a user device as fast as the bandwidth permits with the ability for the app to be interactive for the user under low bandwidth scenarios.

Figure 4C:
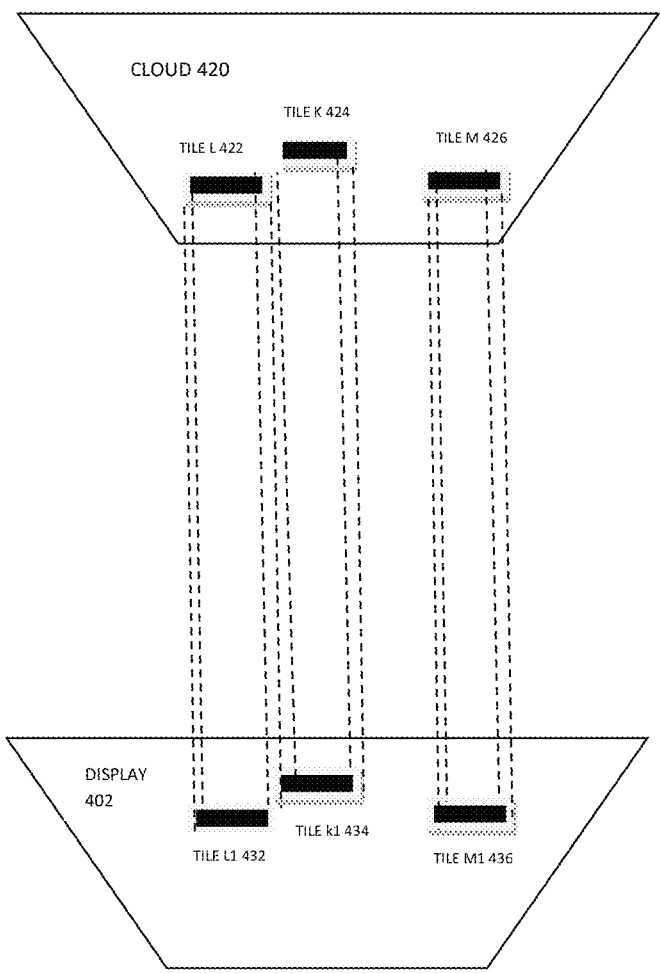
FIG. 4C is a block diagram illustration of a raining algorithm implementation having equally sized rectangles splitting up a remote display of a remote app and sending only rectangle updates, in accordance with an embodiment of the present invention.

Reference is now made to FIG. 4C is a block diagram illustration of a raining algorithm implementation having equally sized rectangles splitting up a remote display of a remote app and sending only rectangle updates, in accordance with an embodiment of the present invention comprising cloud 420 where a server such as remote app server 118 is located, and display 420 of a user device receiving data updates from the cloud 420.

At the present time, pixels within three tiles have been updated by the running application in the cloud. We would like now to update to the user only those rectangles containing pixels that have been updated.

Tile L 422 in cloud 420 has changes and so, it "rains" down to display 420 as tile L1 432. Similarly, tile K 424 in the cloud rains down to display 420 as tile K1 434 and tile M 426 in the cloud rains down to display 420 as tile M1 436.

A current change in a certain tile makes all previous changes obsolete, whether received by the user device or not. For example, if a previous change to tile L as referred to as L1 has been made but not received by the user device, it would be of no use once tile L1 is received. Such a mechanism may assist in handling bursts of changes in a tile, so that in case of some reception problems and bad packets causing the missing some of the tiles in the burst, there is only a requirement for the current latest one and not for the previous ones.

The tiles L, K and M corresponds to the tiles modified in the FIG. 4B. The present FIG. explains how the term raining is relevant to the present application. In this manner, applications that run in the cloud rain their display updates to the user device display while the unmodified rectangles are not sent.

The requirement for the system is to have only the present, most up to date layer of rain on the user display, so if a tile was unsuccessfully sent to the user device and another, more up to date tile for that specific portion has been sent, then the old tile that was not received is "water under the bridge" and no longer relevant as that rain turned to a water stream so to speak if it were to be received. That old rain drop or old tile is no longer required by the user device and user display 402, as only the latest rain drop for each location is required. The old tile is no longer needed.

Up until now we described a rectangle shape which is used to explain the application. In general, any size or shape may be used by the present application, even up to a single pixel. A system may implement a dependency to update several tiles or rain drops together and if some were not received yes then to wait and not show these to the user.

In a preferred embodiment, a generation of modified tiles may be presented to the user at once, so that although some tiles arrive to the user device, the system may decide not to display them to the user as they arrive but together at the same time. This definition of a group of tiles may be used to exhibit a more natural and less bumpy modified display, such as missing tiles that look like holes for a short period until they are resent. Another bumpy display may occur when scrolling the user display. If we do not use the scrolling detector or when part of the display changes frequently, the modifications may appear clunky or resemble a wave of updates and we would like the modification to occur at once. This is another use of a grouping that display several updated tiles only when all or in some cases most of the group has arrived.

In this manner it is possible to keep the user display most up to date with the app running in the cloud and keep the user experience of a locally running app.

Figure 5:
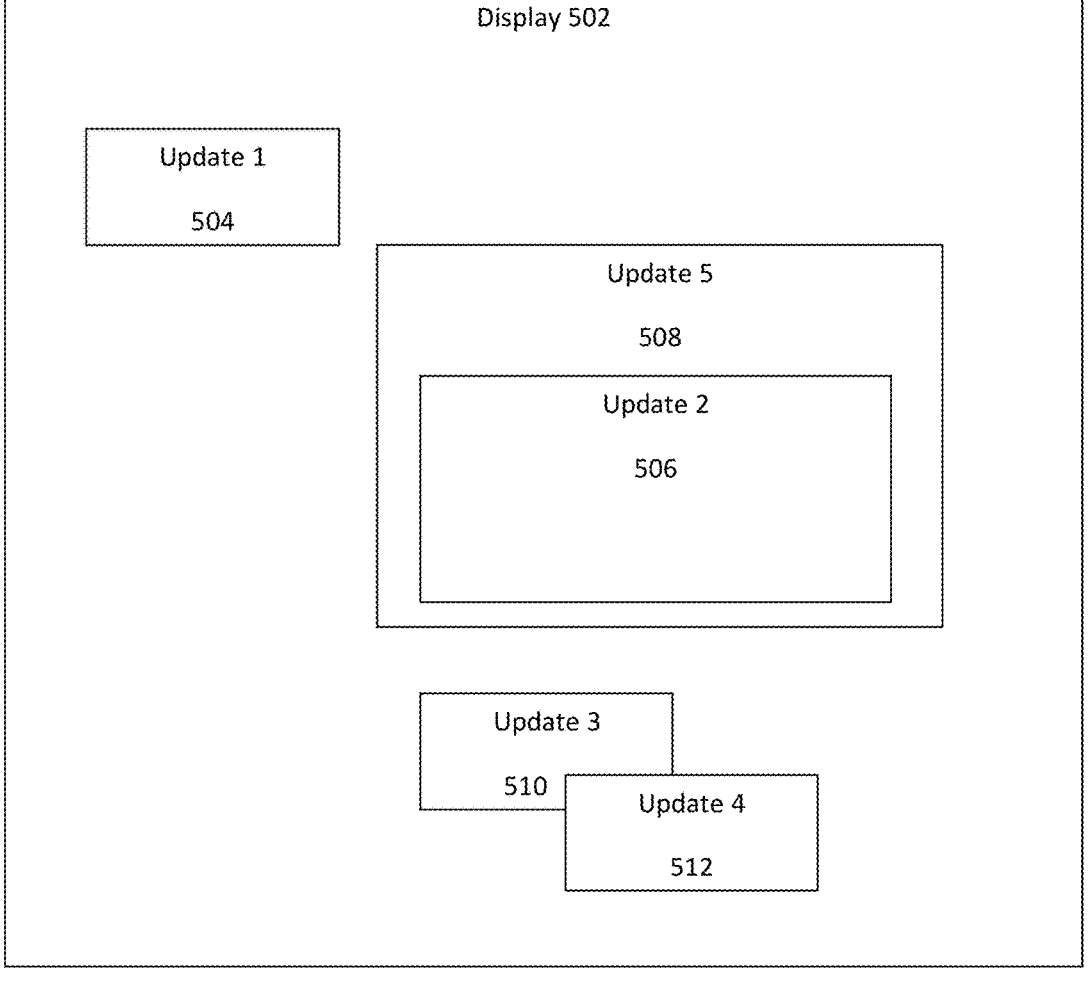
FIG. 5 is a block diagram illustration of generally updating rectangles of remote display of a remote app in order to update local device display of the remote app, in accordance with an embodiment of the present invention.

Reference is now made to FIG. 5, which is a block diagram illustration for generally updating rectangles of remote display of a remote app in order to update local device display of the remote app, in accordance with an embodiment of the present invention comprising display 502 and some updates as they are sent from the remote app server 118 to the user device. The updates are numbered as Tile 1 504 on part of the display. Another update 2 506 is locates in another part of the display. Update 5 506 takes a part of the screen and wholly includes the entire area of update 2 506. Update 3 510 is in another part of the display. Update 4 512 arrives after update 3 510 and partly intersects with it. In this implementation we will use each update as some rectangular image but it may be in other shapes or carry pixel data in other ways such as difference in pixels in the same locations, compression and so forth.

The updates are images representing the display of the remote app and ordered in the way they arrive and so in the case of update 2, in case that update is not received and update 5 has been received, a request to resent update 2 will be ignored.

If update 3 is not received and update 3 is received, the area on the display not covered by update 4 needs to be resent and the images be correctly displayed as to keep update 4 over update 3.

While in the previous image 4 we used non-overlapping rectangles for simplicity to update the remote app display to the user device, we may use other ways to update the display, which may include better carving of the differences. For example, is a small change occurs between four tiles of FIG. 4, all 4 entire tiles will need to be sent. While here only the small area that changed is sent.

The manner of which the change is found may be done as preferred, such as making image difference, then normalizing. Another option is computing feature vectors like histograms. Following marking the differences we may check the proximity of the changes and keep the differences within a certain image up until a threshold is reached. In that case a new image update will be used.

Keeping the image updated this way is more complex than in FIG. 4, requiring to keep the location and dimensions of each update and follow the missing or unacknowledged parts of the display so that to be able to resent the correct updates and remove from them part of the image if another more recent update has been made that share a part of that update. The remote app server 118 always make sure the image of the remote app on the user device is accurate.

In this manner lower total updates and less image area is required to update the user device of the remote app image. However more resends nay be required in low availability of the network, such as a lower service coverage level, a more error prone area and so forth.

Together with image 3 of user touch events communication, the remote app becomes interactive for the user by responding to the latest events and ignoring old ones, specifically old images when covered by newer updates.

In this manner and in conjunction with images 1 and 2 it is possible to update the remote app display information to a user device as fast as the bandwidth permits with the ability for the app to be interactive for the user.

As presented in FIG. 1-5, a remote app executing in a remote server is usable and interactive for the user even in low data bandwidth situations. By low data bandwidth this could also mean a lower bandwidth that would otherwise be required to transmit all of the actual changes occurring on the remote app display. This is made possible by, on the one hand, keeping the communication connectionless, so that there is no backlog of data waiting to be transferred, old data which may be irrelevant now. On the other hand, the communication between the server and the client assures the latest possible image on the user device per the available data bandwidth, and the most important and latest touch events are sent into the remote app and in its correct order. This is in contrast to the display of changes that have been made until the present time. We only care about the actual image now.

Such a system, requiring synchronizing of app image and user commands on both ends is unique in its interactive quality even in low bandwidth situations.

This low bandwidth is made possible for the app image and the user controls as follows. For the app image, only the latest image is sent, skipping over intermediate images. In some embodiments scrolling of image data is identified and only the unavailable data, if any, is sent.

As for the user commands, key important events such as press down and press up, are recorded and resent along with new commands until they are acknowledged, possibly skipping over some movement commands.

The present disclosure shows a preferred embodiment for implementing these requirements; however, this may be implemented in a variety of ways. The present disclosure even brings some examples of other implementations, such as FIG. 4 and FIG. 5.

Figure 6:
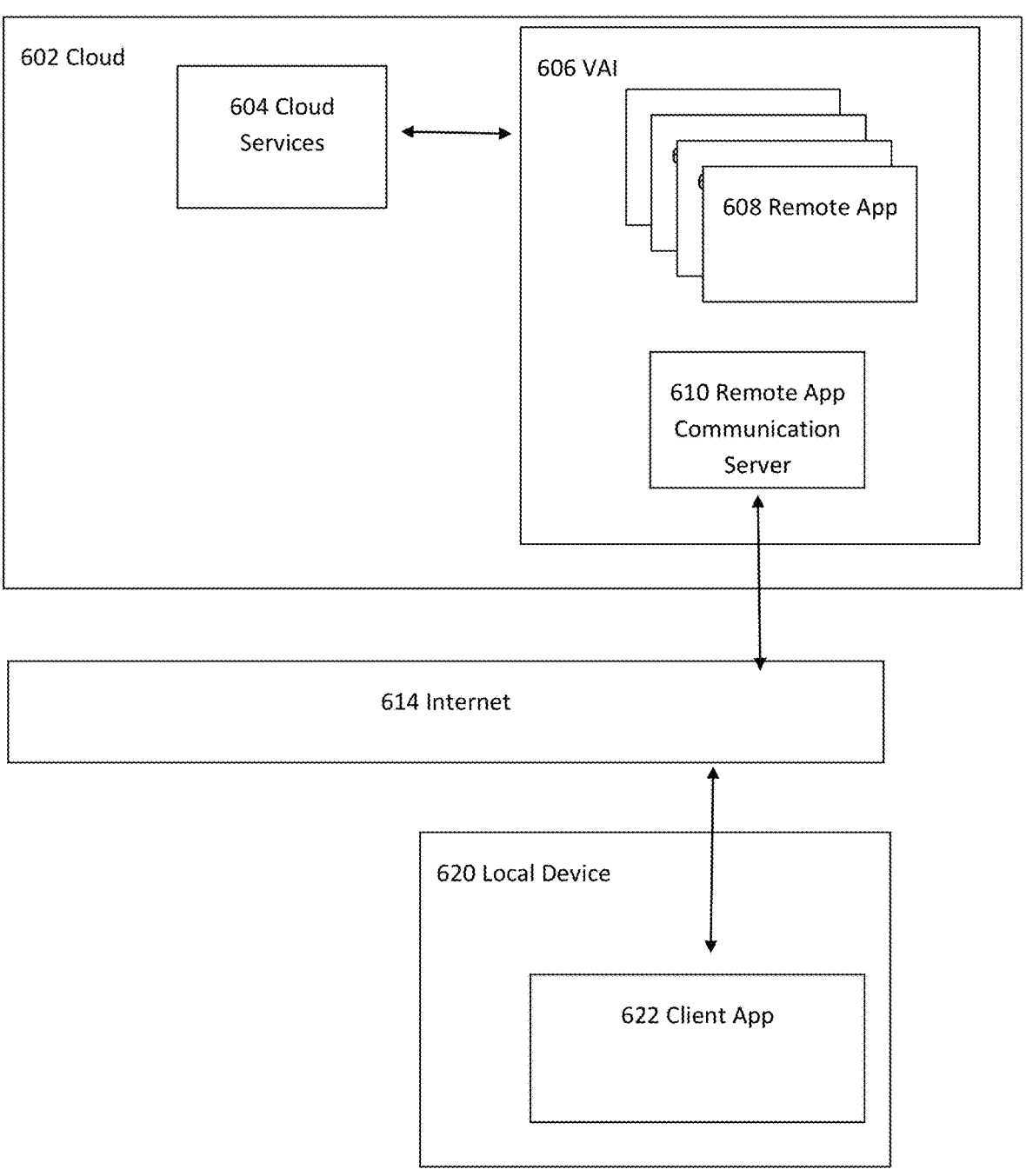
FIG. 6 is a block diagram illustration of a virtual application infrastructure (VAI) running in the cloud executing a remote app for use on a user device, in accordance with an embodiment of the present invention.

Reference is now made to FIG. 6, which is a block diagram illustration of a virtual application infrastructure (VAI) running in the cloud executing a remote app for use on a user device, in accordance with an embodiment of the present invention comprising cloud 602, cloud 602 includes VAI framework 606 implemented preferably by running apps in containers, each app in its own container. App 608 is a remote app for local device 620 controlled remotely by a user through a client app 622 in the local device 620. Remote app 608, along with other apps running for other users, communicates with client app 622 through a remote app communication server 610 for receiving touch events and sending remote app image updates to eh 622 client app. The remote app communication server preferably implements a method of sending only current app displayed data that has not yet reached client app 622 such as by implementing the raining algorithm. The remote app communication server 610 and the local device 620 connect through a network, for example, 614 internet.

The cloud services 604 serving the remote app 608 are sunning in the cloud. The may run on the same cloud 602 or on another cloud. The importance of having both cloud services and endpoint apps executing in the cloud is the lack of access for app to cloud and cloud to app communication, lack of access to cloud API or any app communication. This lets the cloud owner be in control of deployment and separate potential attackers from the cloud service.

In this manner, a remote app may be used by a user on their user device remotely in an interactive manner, offering cloud operators control, flexibility, savings and ease of deployment while offering users a secure way of using apps.

Figure 7:
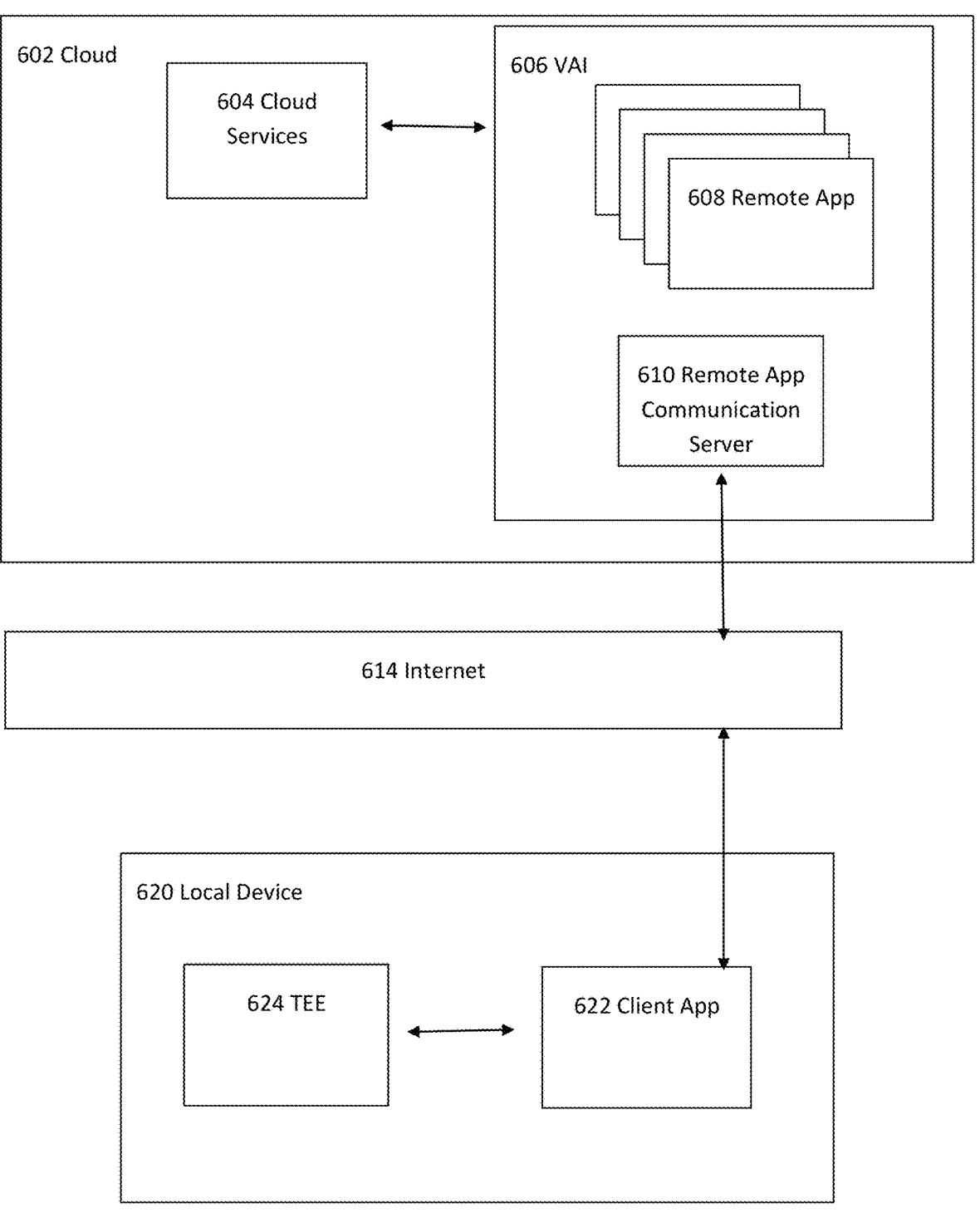
FIG. 7, which is a block diagram illustration of a virtual application infrastructure (VAI) running in the cloud executing a remote app for use on a user device through a TEE, in accordance with an embodiment of the present invention.

Reference is now made to FIG. 7, which is a block diagram illustration of a virtual application infrastructure (VAI) running in the cloud executing a remote app for use on a user device through a TEE, in accordance with an embodiment of the present invention comprising further to FIG. 6, TEE 624, which is a trusted execution environment. A TEE may be available in different devices. We will use for this example, a TEE based on ARM TrustZone available on ARM chips commonly used in mobile devices. In a preferred embodiment the TEE 624 may have access to the device display and touch sensors and may exclusively take control of these resources. When the remote app is being used by the user of local device 620, the communication with remote app communication server 610 is transferred from the client app 622 to the TEE 624 which directly displays the image to device display bypassing the device operating system. User touch events are exclusively received by the TEE and sent to the client app 622. Both touch events and images communicated between TEE 624 and remote app communication server 610 are preferably encrypted with the help of keys located only within the TEE and not available to the device OS. This may be implemented with the help of common asymmetric encryption methods.

In this manner, a remote application may execute interactively on a user device, without said device operating system able to access the display data or the touch events relating to the remotely executing app 608 in the cloud 602. In such a case, the device operating system may not be aware which app is being executed as it has no access to the app communication with the cloud, taking place in the cloud, nor does the device have access to the touch events sent and images and other media types as these are encrypted and useful only by the TEE. The TEE directly makes use of the media and presents it directly to the user bypassing the device operating system. The TEE therefore allows us to achieve security by removing attack surface from the user interaction with the app and the operating system of the device that the user uses to control the remote app.

Bypassing the device operating system means any attempted attack, targeting attempt or collection would fail to bring results from the remote executing app used from the user device. Furthermore, once the app is not in use, it is not easy to say which app was actually used. The actual data of the app is not stored on the device and its communication does not pass through the device. Since the keys within the TEE may be used to identify the device making use of the remote app, the user identity is therefore trusted, in addition to the usage of the app. The actual usage may be likened to the user making use of the app at the cloud premises. Such capability may enable new use cases requiring such level of security.

The description of FIG. 7 demonstrates not only app separation from the user device and internet connected devices but separation of app user interaction from the internet connected device of the user, offering a high level of security. It uses a TEE or trusted execution environment, which may be implemented using TrustZone technology in ARM chips. The TEE may be a small OS like environment for trusted execution separated from the device OS. The term TEE here also applies to any computer program that offers the required display and touch events protection even if it does not amount to a TEE product in itself. In that sense the TEE in this application includes all instances of such capability, even if only covering display image or only covering touch events.

The separation of user interaction from the user device may be implemented for any kind of interaction and data. We mentioned touch events and images, but we may also use other interactions like keyboard, mouse video, sounds, smells, GPS, NFC, etc. In some embodiments this could include user interaction of a Neuralink brain implant where Neuralink is an implantable brain-machine interface. In this case the Neuralink brain implant can send out user requests from the brain such as movement requests or data requests. It would be highly beneficial if this communication was safe from internet eavesdropping and security weaknesses of the OS running on the device that connects to the internet.

Some other user interaction may be sent such as speech, sound, automobile data, industrial machines data etc. There is no limitation to the type of interaction once the app is executing in the cloud and interaction data and various I/O is sent from and to the app. Another example of user interaction may actually be machine oriented, such as separating a robot interaction or even a utility machine from locally running systems and the internet.

The embodiment as in FIG. 7 teach a user interacting with a remotely executing app where the user interaction is separated from the app, the user device operating system and from internet access. Having keys within the TEE may allow the communication with the cloud hosting the remote app to become secure in a way that the cloud uses a public key to protect the image data of the app sent to the user device to be used and presented to the user using the TEE exclusively. Therefore, the user interaction with the app is removed from the access of any 3rd party. Using an app in this manner brings a level of assurance to app users and app vendors which is comparable to having the user physically located at the remote cloud site using the app on cloud devices.

In some embodiment requiring added security when running a certain app, the app is remotely executed away from the user in order to add security and control to managing app execution. For example, with the app in the hand of a malicious user, the user may try attacking the application using its APIs when communicating with the server. In this context, SQL injections, fuzzing and the likes come to mind. Placing the app in the cloud limits the malicious user to touch events, negating other avenues of attack. In this context of touch events it would be beneficial to introduce a touch event firewall, or in a broader sense, a user input firewall. In the touch event firewall scenario, the firewall would check things like, for example, if the maximum number of events in a certain period of time exceeds a certain limit. Another example would be the touch events locations on the display and if they make sense. For instance, if two touch up events occur consecutively in different locations on the screen, without a down event, that may be a situation that is filtered and reported. If move events occur without a down event may also be filtered and reported. A user may become banned from the system after several occurrences of this sort, allowing to better protect the assets of the app owner and their server infrastructure.

The advantage of running an app remotely and being able to keep the user interaction with the app separate from the local OS and other devices on the internet, is that it is similar to having the user physically located at the cloud and using the app at the cloud premises directly without using their own device, bypassing end user device potential security weaknesses as well as simplifying app vendor cloud security checks. This simplification is, among other reasons, because the remote app may only receive specified input events such as touch events. Furthermore, app interaction with the backend servers is not in the hands of potential attackers who may modify this interaction in various ways. Having the app executing within the cloud makes the communication between the app and the cloud servers trustworthy.

Such a scenario opens up new use cases allowing running apps on a local device such as a mobile phone in a mode that is better secured from attacks, allowing sensitive apps to run on the user device as well as to offer a better level of security for end users running apps. Furthermore, it alleviates the hackings checks as required by the app owner. For example, an app owner may make two version of their app, a normal one and one with additional functionality not available in the normal version. Having the app with additional functionality only running in the cloud limits the attack surface of the attacker to touch events, hence simplifying the intrusion checks for the additional functionality. Having an app exclusively available when running remotely may simplify attacks checks and allow new use cases. Such new use cases may be transferring of sensitive medical information, financial information, legal information and so forth. It may allow to read or to make certain actions that would otherwise be considered inappropriate security wise to be taking place using a user device.

There are different ways of implementing apps to be running in the cloud. One way is a public cloud with apps running preferably in containers. Another way is a private cloud on company servers for the use of their employees for running corporate apps securely or for their customers. It is up to the IT department to determine their required level of security and required protection from cyber-attacks in terms of both their cloud servers as well as the endpoints used.

Different methods of data transmissions between the remote app and the user device may be used, based on the current network being used by the user device. In some embodiments, streaming may be used in order to implement the remote app to device data communication. In some embodiments sending simple image updates every so often is used. In another embodiment only changing parts of the display are sent. There may be various ways of sending the updates. In some embodiments different implementations may be used based on current bandwidth availability. For example, in 5G networks availability, streaming may be used, while in lower generation networks image updates may be used with a limited number of updates per second and with the option of image degradation in case of bad network availability. This is an example and other implementations may be made using any network, bandwidth and update implementation.

The user interaction that is explained where a user is watching the touch sensitive display and sends touch gestures may be implemented by other devices such as a PC or laptop with keyboard and mouse. Another example is a Neuralink brain implant. In some embodiments some of the data may be transmitted directly to the brain such as smells, sounds, touch, sight, taste.

In some embodiments the present disclosure may be used to hide the actual application or site being used. This may be done by allowing the control of the remote running app and the viewing of the remote app to be carried out, for example, by a technology like Arm TrustZone and systems that are based on this technology. Such systems may allow the displayed images arriving from the remote app as well as the touch events sent to the remote app, to be hidden from the operating system that runs on the phone, such as the Android OS and all the apps it runs. In this manner the protection and security that are achieved are both for the app operator as well as for the data of the end user. A separate application by the present inventor is made for explaining this case.

In some embodiments a cloud app may be used as a proxy. For example, for going into websites that are not accessible directly. This way the actual app or site being used and so forth, is not running in the local user device, making it possible to use in locations where it is not allowed, and therefore makes it more secure to use.

The separation of I/O from the app that allows the running the app remotely is assisted by the fact that low latency and fast networks are progressing all the time. Home connected devices such as through Wi-Fi are sufficient for running common apps however cellular networks are advancing to 5G. Yet it is preferred that support is sufficient for 4G networks and also for 3G networks. The cloud infrastructure checks the rate of data, loss of packet rate and latency and keeps track of necessary packets left to be sent in order to modify the rate of communication by degrading color depth and resolution. In some embodiments no change in color depth or resolution is allowed.

The term internet may be changed with the word network for internal networks that are not connected to the internet or that are partially connected to the internet.

It is evident there are multiple uses for such technology and its implementation and technology is available today for its implementation. The term attack surface may be used to describe the current disclosure which removes major attack surfaces such as leaving touch gestures as the only attack surface. This is in contrast to currently available attack surface available for attacker such as the app compiled code and its running image which may be modified in the attacker device. Various injections and data communication alterations as well as fuzzing now become unavailable to the attacker.

Further advantages for using such technology is for assisting the app provider in easily making the app fit on all devices by making a single version for latest or one of the latest releases of the phone OS.

Further advantages for using this technology is therefore solving the BYOD problem, where sometimes workers and part time workers, who cannot all get company devices use their own devices. As the gig economy grows so does this problem since these workers usually use their own devices to do work for their current employer, providing a convenient attack vector for the attacker. Using the system in the present disclosure, protects the employer from such issues because now the only input from the user device is their touch events or similar.

Such a solution as presented by the present disclosure may allow carrying out new services that are not available today due to data security issues. It may also allow simplifying regulations in certain fields such as health fields i.e. HIPAA, where routine expensive checks are necessary to be made by cyber experts in order to look at system status, logs and other data available in the company cloud. With the availability of present application, different checks for different issues become unneeded. For example, when the user is limited to certain input such as touch gestures or keyboard and mouse, different checks such as SQL injections become redundant. This disclosure may be also be viewed as if the user is physically located at the cloud using the app on a cloud machine.

The present application furthermore may allow such services as better protection again theft in financial apps, better privacy in health apps and legal apps and so forth.

Constructing a system that serves different users and different apps mat be implemented using Android virtualization preferably in the cloud. Each app may be implemented in a container. A cloud app or several cloud apps may be used per running app in order to send the user I/O into the app and out of the app. For example, user touch events, mouse events or keyboard events or Neuralink events may be sent to the app by a cloud app while display updates or display images or display video stream, may be sent from the app to the user device.

In a preferred embodiment the Android app does not need to be modified and the Android virtualization environment is used to execute the app. The cloud app or multiple cloud apps take care of various communication for the user such as I/O with the user, while the app is used as if on a user device.

Various I/O may be implemented using the present disclosure. Sound, video, GPS, Bluetooth, NFC, Neuralink, touch events, mouse and keyboard events, industrial machines events and any kind of I/O may be used with the app for any purpose of such app, from payments to navigation, from health to finance, any app may be used.

Some data communication may not be required to be sent on the network for example, by implementing image scrolling check and communicating the scrolling information, remembering more than current screen size or in other ways. In some embodiments execution may be tuned to the running app by identifying the current screen in the app or for example, by identifying a keyboard, so as to improve latency by communicating less data than would be required without these functions. Another use for such functions is for sharing remote app data with other apps, either locally running or remotely running. This functionality may be implemented using cloud apps that may identify a sharing request such as copy and paste and implement this functionality using communication with the user running local app. For example, a cloud app may identify a copy of a text in the remote app, extract the text from the app, for example, using OCR, and send the text to the local app to be placed in the local user device clipboard. From there the user may use that text to paste to other apps. Similarly text may be pasted to the remote app by pasting the text into the local app. In this case the text is sent to the cloud app to be pasted to the remote app, for example, like keyboard presses. Text is an example and so other data types may be copies and pasted such as images, complex data structures, text and binary stream data and even application assets.

In some embodiments app notifications that are commonly displayed on the user display when the app is not directly used by the user, may be sent to the local app to be displayed to the user like any app notifies the user. As explained above the cloud app identifies such notifications in the remote app executing and communicate those to the local app to be presented to the user on the display. In some embodiments, the local app on the user device may accomplish these tasks of alerting the user. This may be done on its own or using communication with the cloud in various ways.

In some embodiments keyboard input with locally blinking cursor may be implemented locally and used in conjunction with the remotely executing app. In some embodiments local haptics are used for example for keyboard interaction so that the user gets immediate feedback for key presses that are sent to the remote app. In some embodiments this is done by identifying the running keyboard on the remote app as explained above. For example, the remote app sends the locations of each letter to the local app and the local app employs local haptics, such as vibration or sound or both when the user touches those locations during the time the virtual keyboard is displayed. The remote app may report when the virtual keyboard is displayed or the local app may check the image displayed to sense the virtual keyboard.

The responsiveness of the remote app is of great importance when executing an app remotely and therefore ultra-low latency is preferred. A local cloud implementation and tuned algorithms for responsiveness are used as explained in this disclosure.

In some embodiments, low bandwidth and low latency are supported and provided in addition to fast 4G and 5G networks. This is especially useful for business apps that change little as opposed to gaming/video apps.

Encryption is preferably used in the communication of image and events. In some embodiments, security keys may be coupled online using an authenticator app. In other embodiments a user password may be used or some other user input that is made through a separate website. SSL may be used as an example. There are many ways to share encryption keys and this can be looked up, as this application only makes use of the technology.

In an embodiment of the present invention, the present application allows the separation of user interaction from internet connected devices for bringing a level of assurance to app users that is comparable to having the user physically located at the server or cloud. Furthermore, using apps in this manner simplifies penetration checking for regulation purposes as well as simplifying IT operations and overall cyber security protection for organizations. Also, this allows new use cases not possible until today. This improves and aids app vendor infrastructure security by enforcing input of a certain kind such as touch events. The present system and method do not tackle cyber-attack vectors but rather remove them by removing the app from the hands of the attacker.

CONCLUSION, RAMIFICATIONS AND SCOPE

Accordingly, the reader will see that the disclosure of this invention provides a system and method for executing a remote app on a user device. The remote app interactive property is preferably kept so the app acts as if it is local to the user device.

The disclosure describes, among other things, a remote app with display data and a user device sending user events such as touch events. Furthermore, a communication control between the app and the user device is described such that the available bandwidth is utilized in order to keep the interactive property over other properties, such as, keeping the video consistent or degrading the image.

The presented system may be used interactively even in low data bandwidth availability while keeping the app interactive for the user.

The separation of the app from the user protects app execution, app security and app vendor infrastructure security.

Such service may allow carrying out services that are not available today due to security issues. It may also allow simplifying regulations in certain fields such as health, where expensive checks are necessary by cyber experts to look at logs for any security breaches. Having a technology such as this can make redundant many issues that are required to be checked. For example, if the user is limited to certain input, or if the user is physically at the cloud, then it solves many endpoint issues.

Such services allow better protection again theft in financial apps, better privacy in health apps and legal apps and so forth.

Such service may allow preventing a situation such as in Rick and Morty in the death crystal episode, where each universe Rick wakes up in is a dark regime, and that apparently became the default.

Such system and such services may offer a solution to BYOD where at least part of the workforce uses their own devices. In some cases a BYOD may include malicious users and the present application prevents them from using the actual app as a vector of attack.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

It is expected that during the life of this patent many relevant devices and systems for separating user interaction from apps and from internet or network connected devices reach will be developed and the scope of the terms herein, particularly of the terms "cloud", "app", "endpoint", "user interaction", "user commands", "user input", "user output", "internet", "network", "local device", and "operating system", are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for interactive execution of remote apps on user devices, comprising:
a remote app cloud service configured to execute remote apps;
a client app facilitating user interaction with said remote apps by sending user input events to control the remote apps and receiving discrete display image updates;
a mechanism for updating the current display of remote apps on user devices, said mechanism transmitting discrete current display image data representing regions of a graphical user interface of currently displayed content by said remote apps, the regions being statically defined or dynamically determined;
wherein each region of the graphical user interface is associated with a version identifier indicating a current state of that region at the remote app cloud service, and the client app transmits to the remote app cloud service version identifiers representing the versions of respective regions currently displayed at the client app;
wherein said mechanism selects for transmission only those regions whose version differs from the version at the client, and intermediate versions of regions are discarded without transmission when a subsequent version exists
thereby ensuring that displayed images of remote apps on user devices correspond to the current state of the remote app to enable user input events to correspond with the current content, thereby facilitating interactive control of remote apps.

2. The system of claim 1 wherein user input events received from said user devices are monitored for anomalies based on user input events expected through human control thereby implementing a user input events firewall for said remote app cloud service.

3. The system of claim 1 further comprising a trusted user environment wherein display updates are received through a trusted user environment when said client app is used thereby hiding user interaction with said remote apps from operating system of said user devices for achieving security by removing attack surfaces.

4. The system of claim 1, wherein the version identifier for each region comprises a monotonically increasing value incremented by the remote app cloud service when content of a corresponding region changes.

5. The system of claim 1, wherein intermediate versions of a region are not retransmitted once superseded by a subsequent version.

6. The system of claim 1, wherein the regions are dynamically determined based on detected changes in the graphical user interface.

7. The system of claim 1, wherein the regions comprise rectangular portions of the graphical user interface.

8. A method of interactively using a remote application on a user device, comprising:
a. executing the remote application on a remote server;
b. partitioning a graphical user interface of the remote application into regions;
c. maintaining, at the remote server, a current version for each region;
d. receiving, from the user device, version identifiers indicating regions for which the user device already possesses a current version of a region;
e. transmitting from the remote server to the user device only regions for which the user device does not possess the current version, while refraining from transmitting regions that have not changed or are already present at the user device;
f. discarding intermediate versions of a region when a subsequent version exists prior to transmission; and
g. receiving user input events from the user device to control the remote application based on displayed regions corresponding to current versions,
whereby interactive control of the remote application is supported without transmission of outdated or superseded display data.

9. The method of claim 8, wherein partitioning the graphical user interface comprises dynamically determining regions based on detected display changes.

10. The method of claim 8, wherein regions acknowledged as already present at the user device are excluded from subsequent transmissions.

11. The method of claim 8, wherein discarding intermediate versions comprises discarding queued display updates when a newer version is generated prior to transmission.

12. A system for synchronizing display output of a remote application on a user device, comprising:
a remote server configured to execute the remote application and generate display output;
a user device configured to receive display updates from the remote server and transmit to the remote server which display updates it possesses;
wherein the remote server is configured to transmit to the user device display updates corresponding to a latest state of the remote application that the user device does not yet possess, while skipping transmission of at least some intermediate display states generated by the remote application by comparing version identifiers received from the user device with version identifiers maintained by the remote server;
whereby the user device displays current application content without requiring transmission of all intermediate display states.

13. The system of claim 12, wherein the latest state corresponds to a snapshot of display output rather than a sequence of frames.

14. The system of claim 12, wherein skipped intermediate display states are not retransmitted after a subsequent display state is transmitted.

15. A method of synchronizing display output of a remote application on a user device, comprising:
a. executing the remote application on a remote server;
b. generating display output reflecting successive states of the remote application, wherein the display output is associated with one or more regions;
c. transmitting to the user device display updates corresponding to a latest state not yet available at the user device in response to determining that a client-side version of at least one region of the one or more regions is outdated relative to a server-side version of said at least one region; and d. skipping transmission of at least some intermediate display states generated between successive transmitted display updates to prioritize the transmission of a current state;

whereby the user device receives current display output without receipt of all intermediate display states.

16. The method of claim 15, wherein the one or more regions are part of a fixed grid of rectangular tiles.

17. The method of claim 15, wherein the one or more regions are defined dynamically based on changes between the successive states.

18. The method of claim 15, wherein the display updates corresponding to a latest state are associated with a serially incremental counter used as a version identifier.

19. The method of claim 15, wherein the step of skipping transmission is performed dynamically based on a detected network condition.

20. The method of claim 19, wherein the detected network condition is network congestion level, available bandwidth, or a latency threshold.

21. The method of claim 15, wherein skipping transmission of intermediate display states comprises skipping multiple successive display states generated between transmissions.

* * * * *